Jan. 20, 1953 M. R. WINKLER 2,626,384

SELECTIVE SIGNALING SYSTEM

Filed July 10, 1950

INVENTOR.
Marion R. Winkler
BY
Norman L. Mueller
Atty.

Patented Jan. 20, 1953

2,626,384

UNITED STATES PATENT OFFICE 2,626,384

SELECTIVE SIGNALING SYSTEM

Marion R. Winkler, Phoenix, Ariz., assignor to Motorola, Inc., Chicago, Ill., a corporation of Illinois Application July 10, 1950, Serial No. 172,788

11 Claims. (Cl. 340—156)

Figure 1:
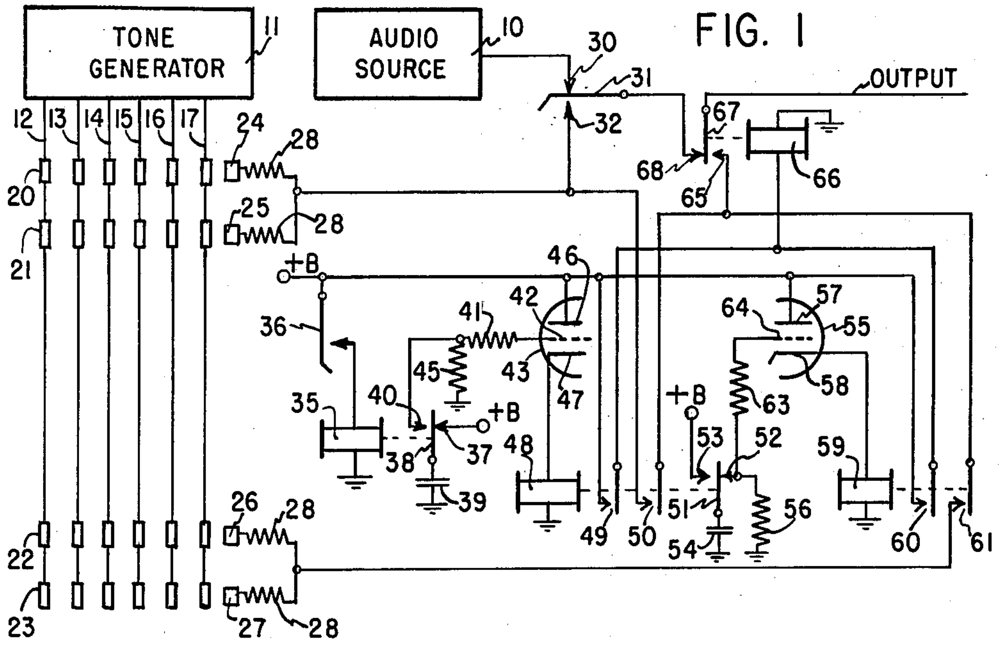

This invention relates generally to selective control systems and more particularly to such a control system which is adapted to selectively control remote units individually or in groups.

The control of remote equipment from a central station has become essential in many different types of operations such as in communication systems and in distributing systems for power, gas or other commodities. In such systems control signals may be transmitted in various ways, as by wire circuits or by radio to perform the remote operation. In many applications it is desired to use a single channel, which may be either wire or radio, for transmitting a plurality of controlling signals and perhaps for transmitting signals for other puposes. In communication systems it may be desired to transmit the control signals over the same channel used to transmit audio or other communication signals.

In many of these applications it is desired to have individual control over each remote unit so that each unit may be signalled or controlled in some other manner. It may also be desirable to control a plurality of units at the same time and in this instance it is, of course, preferable that both individual and group control be provided by a single system. As an example, radio communication systems have been used for communicating with police cars and taxi cabs to instruct the officers or drivers as to calls which should be made. It is desirable in such a system to provide individual control so that each car can be called individually. There are instances, however, in which it is necessary to call a plurality of cars to give all these cars a single message at the same time. It is therefore desired to provide an arrangement whereby the operator at the central station can simultaneously call a plurality of remote units to give them all a single message.

It is therefore an object of the present invention to provide a simple and effective system for selectively signalling a plurality of units from a central station which can signal the units either singly or in groups.

A further object of this invention is to provide such a selective signalling system which is suitable for use in mobile installations wherein it is necessary that the equipment be rugged and be as simple and compact as possible.

A still further object of the present invention is to provide a selective calling system for a communication network in which the circuits providing control of individual units are utilized together with a minimum of additional parts to provided calling of groups of the units to transmit a message thereto simultaneously.

A feature of this invention is the provision of a signalling system for controlling remote units in which pairs of tones are transmitted in timed sequence for signalling individual units and single tones of each pair are transmitted together for a relatively long time interval to call a group of the units.

Another feature of this invention is the provision of a tone transmitting unit including a timer arrangement for automatically transmitting pairs of tones in timed sequence to provide individual signals and including an arrangement for transmitting single tones of each pair for a relatively long time interval to provide group signals.

Still another feature of this invention is the provision of a selective responsive unit including frequency responsive devices responsive to different tones and connected in a first circuit which provides a control when the tones to which the devices respond are applied in pairs in timed sequence, with certain of the devices being connected in a second circuit which operates when single tones of each pair are applied together for a relatively long time.

Figure 2:
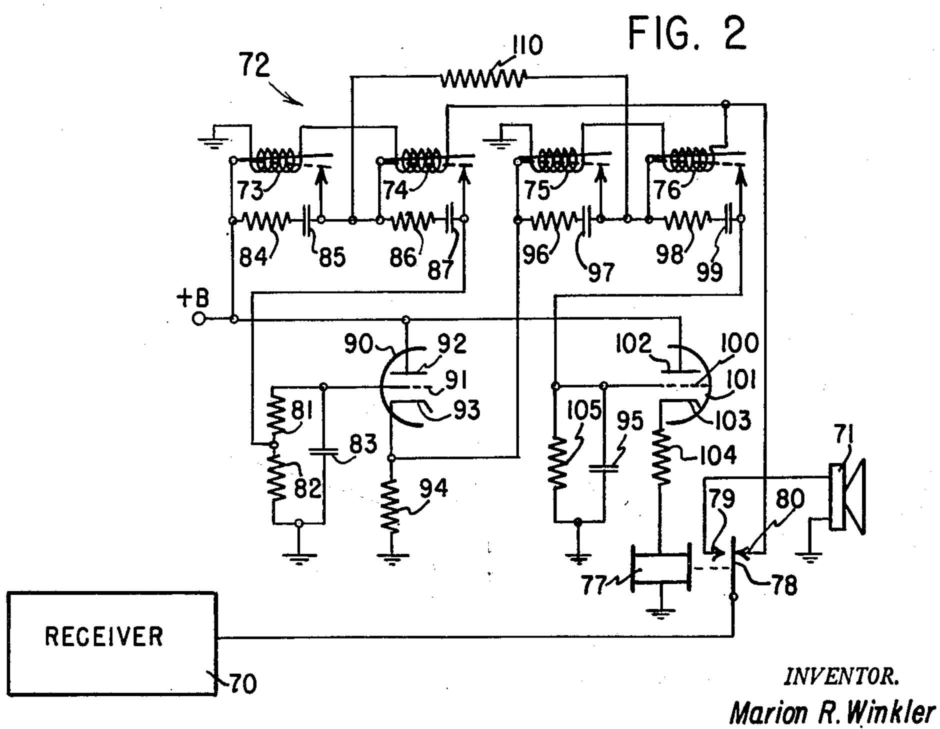

Further objects, features and many attending advantages of the invention will be apparent from a consideration of the following description when taken in connection with the accompanying drawings in which:

Fig. 1 is a circuit diagram of the transmitting unit of the selective signalling system in accordance with the invention; and Fig. 2 is a circuit diagram of the receiving unit of the selective signalling system.

In practicing the invention there is provided a signalling system including a transmitting unit which may be provided at a central station and a plurality of receiving units which may be provided at remote units, as for example the mobile cars of a police system. The transmitting unit includes a tone generator for providing a plurality of individual tones, the number of which depends upon the complexity of the system. Switching means are provided for selectively connecting various tones from the generator to a timing system which is arranged to apply the tones in pairs in timed sequence. That is, the first pair of tones is transmitted simultaneously for a short time duration, and then a second pair of tones is transmitted for substantially the same time duration. The switching means may also be used to connect one pair of tones to a manual switch which may be used to apply the tones to the system for any desired time duration.

The receiving unit of the system includes a plurality of pairs of frequency responsive devices, with each pair being connected in a circuit and operative when the tones to which the devices thereof respond are applied thereto for transferring a voltage from one element to a second element. The first pair of devices is connected in a first circuit for transmitting the voltage from a source to a first impedance element, and the next circuit transmits the voltage from the first impedance element to a second impedance element. Two or more such circuits may be provided. A resistor is included for providing an auxiliary circuit including one device of each circuit for applying the voltage from the source to the impedance element of the second circuit when the tones to which the devices in the auxiliary circuit respond are applied for a relatively long time.

Referring now to the drawings, in Fig. 1 there is illustrated a system for selectively applying an audio signal and control signals over a single audio channel. The audio source is designated as 10 and the generator for producing tones of various frequencies to make up different control signals is designated as 11. The tone generator generates signals in the audio frequency range and may provide any desired number of tones or signals of different frequencies. The tone generator 11 is illustrated as having six different frequencies which are applied to the conductors 12, 13, 14, 15, 16 and 17. These conductors are connected individually to contacts 20, 21, 22 and 23 of switching means which have movable contacts 24, 25, 26 and 27. The movable contacts are individually adjustable and may be selectively connected with any one of the contacts of the switching means to thereby derive the tone of a particular frequency. That is, the movable contact 24 may engage any of the contacts 20 which are connected to the conductors 12 to 17 inclusive and the movable contact 25 may engage any of the contacts 21 on these conductors. Similarly, the movable contacts 26 and 27 may engage any one of the contacts 22 and 23 respectively to apply the tones therefrom to the signalling system. Isolating resistors 28 are connected to the contacts 24, 25, 26, and 27 to prevent interference between interconnected tone generators.

The audio source 10 is connected to the contact 30 of the single pole double throw switch 31. The movable contacts 24 and 25 through which tones are applied are connected to the contact 32 of this switch so that the switch can apply either the audio source or the tones from the contacts 24 and 25 to the movable contact 31. This movable contact is connected to the output of the system as will be described more in detail.

A timing system is provided for selectively applying the tones from the contacts 24, 25, 26 and 27 to the output of the system in a predetermined sequence. The timing circuit includes a first relay 35 connected to the plus B source through manually operated switch 36. The relay includes contact 37 connected to plus B, movable contact 38 connected to condenser 39, and fixed contact 40 connected through resistor 41 to the grid 42 of the tube 43. In the position shown the movable contact 38 connects the condenser 39 to plus B to charge the same and when the relay is actuated the condenser is connected to the grid 42 to render the tube 43 conducting. A resistor 45 is connected to the contact 40 for discharging the condenser 39 so that the tube 43 is rendered conducting for a limited time interval. The tube 43 includes an anode 46 connected to plus B and a cathode 47 connected to relay 48. When the tube 43 conducts the relay 48 is actuated and operates to close contacts 49 and 50 and to move the contact 51 away from fixed contact 52 into engagement with fixed contact 53. The contact 53 is connected to plus B so that when the relay 48 is operated the condenser 54 is charged thereby.

As previously stated, the condenser 39 is discharged through resistor 45 so that the tube 43 will conduct for only a limited interval. When the tube 43 ceases to conduct the relay 48 will drop out so that the condenser 54 will be connected to the fixed contact 52 and the voltage thereon will be applied through resistor 63 to the grid 64 of tube 55. A resistor 56 is also connected to fixed contact 52 for discharging the condenser 54 after a limited time. The tube 55 includes an anode 57 connected to plus B and a cathode 58 connected to relay 59 for energizing the same. The relay 59 includes contacts 60 and 61 and will hold these contacts closed while the condenser 54 is charged to a sufficient value to hold the tube 55 conducting.

Considering now the operation of the timing system, the contacts 24, 25, 26 and 27 will be positioned to connect predetermined tones into the system. The key 36 will then be operated to connect the condenser 39 to the grid of tube 42 to render the tube 43 conducting and cause the relay 48 to be actuated. The contacts 50 of the relay are connected to the movable contacts 24 and 25 and apply the signals therefrom to the fixed contact 65 of relay 66. The contacts 49 of the relay 48 are connected to the winding of the relay 66 and energize the same so that the movable contact 67 will be drawn into engagement with the fixed contact and the tones from the contact 24 and 25 will therefore be applied to the output of the system. After the condenser 39 has discharged, the relay 48 drops out, the condenser 54 will be connected to the grid 64 of the tube 55 to cause this tube to conduct and the relay 59 to be actuated. Contacts 61 of the relay 59 are connected to the movable contacts 26 and 27 and apply the tones therefrom to the fixed contact 65 of the relay 66. The contact 60 of the relay 59 holds the relay 66 energized so that the tones are applied to the output of the system, for a predetermined time interval. After this time interval, that is when condenser 54 is discharged, the movable contact 67 of the relay 66 will fall back and engage fixed contact 68 to apply the audio source to the output.

It is therefore seen that the system of Fig. 1 may be used to apply a signal, including as components thereof two pairs of tones in sequence, to the output of the system, in which case each of the pairs of tones will be applied for a predetermined interval. The system can also be used to apply a signal having as components only the tones from the contacts 24 and 25 with this signal being applied through the manual switch 31 in which case the signal will be applied for the entire length of time that the switch 31 is held actuated. When the calling signal is not being applied, the audio source is applied to the output of the system.

In Fig. 2 there is disclosed a responsive system which is responsive to a control signal such as that produced by the system of Fig. 1. This system includes a receiver 70, a loudspeaker 71, and a responsive system 72 for selectively connecting the loudspeaker to the receiver. The responsive system includes four electromechancial frequency responsive devices 73, 74, 75 and 76 each of which includes a winding and a pair of contacts which are intermittently closed when the frequency to which the device responds is applied to the winding. A relay 77 is provided having a movable contact 78 connected to the receiver 70, a fixed contact 79 connected to the loudspeaker 71, and a fixed contact 80 connected to the winding of the electromechanical devices 73, 74, 75 and 76 respectively. When the relay 77 is deenergized, the signals from the receiver 70 are applied to the windings of the electromechanical devices 73 and 74 in series with these devices being connected in parallel with the devices 75 and 76 which are also connected in series. It is therefore seen that the windings of all the contactors are connected to the output of the receiver at the same time.

The contacts of the electromechanical devices 73 and 74 are connected in a series circuit from plus B through the device 73, the device 74, and to the common terminal of resistors 81 and 82 which are connected across condenser 83. The contacts of each of the devices are bridged by a resistor and a condenser with resistor 84 and condenser 85 bridging the contacts of the device 73 and resistor 86 and condenser 87 bridging the contacts of the device74. Intermittent closing of the contactors 73 and 74 will cause the condenser 83 to be charged through resistor 81 from the B plus source. This frequency selective system is described in the copending application of Ralph J. Lense and Alfred S. Holzinger, Serial No. 2,749,952 filed May 23, 1947, now Patent No. 2,547,023 issued April 3, 1951, subject, Selective Calling Systems. It is readily seen that when the contacts of the device 73 are closed a circuit is provided through this contactor and through resistor 86, condenser 87, resistor 81 and condenser 83. This will cause both condensers 87 and 83 to be charged. Then when the contacts of the device 74 close, a circuit is provided through resistor 84, condenser 85, resistor 81 and condenser 83 for charging condensers 85 and 83. When the contacts of the device 74 are thus closed, the condenser 87 will be discharged but the charge will continue to be built up on condenser 83 as the contacts of either of the devices close.

When the voltage on condenser 83 builds up to a predetermined value, this will render the tube 90 conducting since the condenser is connected to the grid 91 of the tube. The anode 92 of the tube is connected to plus B and the cathode 93 is grounded through resistor 94. Therefore when the tube 90 conducts a voltage will be built up across the resistor 94. The resistors 81 and 82 will tend to discharge the condenser 83 so that the tube will be rendered conducting for only a limited time after the devices 73 and 74 cease operating. The devices 75 and 76 operate in the same manner to apply the voltage from resistor 94 to the condenser 95. The contacts of device 75 are bridged by resistor 96 and condenser 97, and the contacts of device 76 are bridged by resistor 98 and condenser 99. The condenser 95 is connected to the grid 100 of the tube 101 and renders this tube conducting when the voltage on condenser 95 reaches a predetermined value. The tube 101 includes a plate 102 connected to plus B and a cathode 103 connected through resistor 104 to the relay 77. A resistor 105 is bridged across the condenser 95 for discharging the same so that the tube 101 will be rendered conducting for only a predetermined time interval. The relay 77 therefore operates when the tube 101 is conducting, so that the movable contact 78 engages the fixed contact 79 to connect the output of the receiver 70 to the loudspeaker 71. The system therefore operates to connect the loudspeaker to the receiver when the signal including the frequencies to which the devices 73 and 74 respond is first applied and then a signal including the frequencies to which the contactors 75 and 76 respond is applied.

In accordance with the invention there is provided an arrangement for operating the relay 77 when a signal including only the frequency to which the devices 73 and 76 respond are applied thereto. Such operation is provided by the circuit through resistor 110. This circuit is completed from plus B through the contacts of device 73, resistor 110, contacts of device 76, and condenser 95. This circuit will operate in the manner previously described to charge condenser 95 when the devices 73 and 76 are simultaneously operated. However, the resistor 110 is of relatively large value and in order for the voltage to build up on condenser 95 to a sufficient value to render tube 101 conducting, the contactors 73 and 76 must operate for a relatively long period of time. The system of Fig. 2 is therefore rendered operative in response to two pairs of tones each of which is transmitted for a short period of time, with the pairs being transmitted in sequence, or to a single pair of tones which are applied for a relatively long period of time.

From the above it is seen that there are provided signalling and responsive systems which may be operated to provide individual calls or group calls. That is, when the two pairs of tones are transmitted in sequence, only those units having frequency responsive devices which respond to these pairs of tones in the predetermined sequence will be operated. However, when a single pair of tones is transmitted for a relatively long period of time, all systems having particular devices responsive to these two tones will be operated. Considering an example, the responsive system of Fig. 2 may be constructed so that the device 73 responds to the tone of conductor 12 of Fig. 1, the device 74 to the tone of conductor 13, the device 75 to the tone of conductor 14 and the device 76 to the tone of conductor 15. The responsive system will then operate when the signalling system transmits the tones of conductors 12 and 13 as the first pair and the tones of conductors 14 and 15 as the second pair. However, by applying the tones of conductors 12 and 15 through the switch 31 for a relatively long time interval, the system of Fig. 2 may also be made to respond. It is therefore apparent that the devices 74 and 75 may be selected to respond to various different frequencies so that the individual units will respond to different calls when two signals including pairs of tones are transmitted for short durations and in succession. Yet, as long as the devices 73 and 76 are responsive to the same frequencies, all units will respond to a signal including the two frequencies to which these two units respond if this signal is applied for a relatively long time, as by using the manually controlled switch 31. The number of individual calls may be further increased by reversing the devices 73 and 76 as the system will then still respond to the same group call. This is because the two group call tones are sent at the same time and the devices 73 and 76 operate at the same time and there is no problem of order of the tones.

The system for providing group signalling along with individual signalling is relatively simple and the group signalling facilities require only a very small amount of additional equipment. At the transmitting unit only the switch 31 is required for group signalling in addition to the equipment required for providing the individual signals. The switch 31 may be a simple mechanical arrangement or may include timing means to insure that the group tones are transmitted for the required time interval. At the receiving unit only the resistor 110 is required for providing group signalling, over and above the equipment required for individual signalling. This results in a very simple overall equipment which provides the advantage of either individual or group signalling.

Although one embodiment of the invention has been described which is illustrative thereof, it is obvious that various changes and modifications can be made therein without departing from the intended scope of the invention as defined in the appended claims.

I claim:

1. A selective responsive system including a transmitting unit and at least one receiving unit operatively associated therewith, said transmitting unit including means providing a plurality of individual tones, means for selecting first and second pairs of tones, means for transmitting said pairs of tones in timed sequence with each pair being transmitted for a relatively short time duration, and means for transmitting one tone of each of said first and second pairs for a relatively long time duration, said receiving unit including first and second pairs of frequency selective devices individually responsive to predetermined ones of said tones, a first circuit including said devices which is rendered operative when the tones to which said first and second pairs of devices are responsive are applied thereto for short time durations and in timed sequence, and a second circuit including one of said devices of each of said pairs which is rendered operative when the tones to which the said devices are responsive are applied thereto for a relatively long duration.

2. A selective responsive system including a transmitting unit and a plurality of receiving units operatively associated therewith, said transmitting unit including means providing a plurality of individual tones, means for selecting first and second pairs of tones, means for transmitting each pair of tones for a relatively short time duration and in sequence, and means for transmitting one tone of each pair for a relatively long time duration, each of said receiving units including first and second pairs of frequency selective devices individually responsive to predetermined ones of said tones, a first circuit including said devices which is rendered operative when the tones to which said first and second pairs of devices are responsive are applied thereto for short time durations and in sequence, and a second circuit including one of said devices of each of said pairs which is rendered operative when the tones to which said devices of said second circuit are responsive are applied thereto for a relatively long duration, said devices of said second circuits of all said receiving units responding to the same tones so that the transmission of such tones by said transmitting unit for a relatively long time duration render said second circuits of all said receiving units operative.

3. A selective responsive system including a transmitting unit and at least one receiving unit operatively associated therewith, said transmitting unit including in combination, means providing a plurality of individual tones of different frequencies, timing means for automatically transmitting first and second pairs of tones in timed sequence, first switching means for selectively connecting first, second, third and fourth tones to said timing means, and second switching means for simultaneously transmitting said first and fourth tones for a relatively long time duration, said receiving unit including in combination, first, second, third and fourth frequency selective devices each of which includes means for providing a conductive path in response to said first, second, third and fourth tones respectively, first and second impedance elements, a source of potential, a first series circuit including said source of potential, said first and second devices and said first impedance element for producing a voltage across said impedance element in response to the application of a signal which includes said first and second tones for a short time duration, a second circuit coupled to said first impedance element and including said third and fourth devices and said second impedance element connected in series, said second circuit providing a voltage across said second impedance element when a voltage exists across said first impedance element and a signal including said third and fourth tones is thereafter applied for a short time duration, and resistance means connecting the common connection between said first and second devices and the common connection between said third and fourth devices and providing in effect a third circuit including said source of potential, said first device, said fourth device and said second impedance element for providing a voltage across said second impedance element in response to the application of a signal including said first and fourth tones for a relatively long time duration, said resistance means limiting the current through said third circuit.

4. A selective responsive unit for providing selective operation in response to signals including predetermined frequencies, said unit including in combination, first and second pairs of frequency selective devices, first and second impedance elements, a source of potential, a first circuit including said source of potential, said devices of said first pair and said first impedance element for producing a voltage across said first impedance element in response to the application of a signal which includes the frequencies to which said devices of said first pair are responsive for a short time, a second circuit coupled to said first impedance element and including said devices of said second pair and said second impedance element, said second circuit providing a voltage across said second impedance element when a voltage exists across said first impedance element and a signal including the frequencies to which the devices of said second circuit are responsive is thereafter applied for a short time, and impedance means interconnecting said first and second circuits providing in effect a third circuit including said source of potential, one of said devices of each of said pairs and said second impedance element for providing a voltage across said second impedance element in response to the application of a signal including the frequencies to which said devices of said third circuit are responsive for a relatively long time.

5. A selective responsive unit for providing selective operation in response to signals including predetermined frequencies, said unit including in combination, first and second pairs of frequency selective devices each of which includes means for providing a conductive path in response to one of said predetermined frequencies, first and second impedance elements individually associated with said pairs of frequency selective devices, a source of potential, a first circuit including said source of potential, said devices of said first pair and said first impedance element for producing a voltage across said first impedance element in response to the application of a signal which includes the frequencies to which said devices of said first pair are responsive for a short time duration, a second circuit coupled to said first impedance element and including said second pair of frequency selective devices and said second impedance element, said second circuit providing a voltage across said impedance element thereof when a voltage exists across said first impedance element and in response to the application of a signal including the frequencies to which the devices of said second circuit are responsive for a short duration, and circuit means interconnecting said first and second circuits providing in effect a third circuit including said source of potential, one of said devices of each of said pairs and said second impedance element for providing a voltage across said second impedance element in response to the application of a signal including the frequencies to which said devices in said third circuit are responsive for a relatively long time duration, said circuit means including impedance means for restricting the flow of current through said third circuit.

6. A selective responsive unit for providing selective operation in response to signals including predetermined frequencies, said unit including in combination, first, second, third and fourth frequency selective devices each of which includes means for providing a conductive path in response to one of said predetermined frequencies, first and second impedance elements, a source of potential, a first series circuit including said source of potential, said first and second devices and said first impedance element for producing a voltage across said impedance element in response to the application of a signal which includes the frequencies to which said first and second devices are responsive for a short time duration, a second circuit coupled to said first impedance element and including said third and fourth devices and said second impedance element connected in series, said second circuit providing a voltage across said second impedance element when a voltage exists across said first impedance element and a signal including the frequencies to which said third and fourth devices are responsive is thereafter applied for a short time duration, and resistance means connecting the common connection between said first and second devices and the common connection between said third and fourth devices and providing in effect a third circuit including said source of potential, said first device, said fourth device and said second impedance element for providing a voltage across said second impedance element in response to the application of a signal including the frequencies to which said first and fourth devices are responsive for a relatively long time duration, said resistance means limiting the current through said third circuit.

7. A selective responsive unit for providing selective operation in response to signals including predetermined frequencies, said unit including in combination, first, second, third and fourth frequency selective devices each of which includes means for providing a conductive path in response to one of said predetermined frequencies, first, second and third impedance elements, a source of potential, a first series circuit including said source of potential, said first and second devices and said first impedance element for developing a voltage across said impedance element in response to the application of a signal which includes the frequencies to which said first and second devices are responsive for a short time duration, an electron discharge valve having input and output electrodes, said input electrode of said valve being converted to said first impedance element to render said valve conducting when a predetermined voltage is developed across said first impedance element, said second impedance element being connected to said output electrodes of said valve so that a voltage is produced thereacross when said valve conducts, a second circuit including said second impedance element, said third and fourth devices and said third impedance element connected in series, said second circuit developing a voltage across said third impedance element when a voltage exists across said second impedance element and a signal including the frequencies to which said third and fourth devices are responsive is thereafter applied for a short time duration, and resistance means connecting the common connection between said first and second devices and the common connection between said third and fourth devices and providing in effect a third circuit including said source of potential, said first device, said fourth device and said third impedance element for developing a voltage across said third impedance element in response to the application of a signal including the frequencies to which said first and fourth devices are responsive for a relatively long time duration, said resistance means limiting the current through said third circuit.

8. A selective signal transmitting unit including in combination, a signal source providing a plurality of individual signals of different frequencies, timing means for automatically transmitting said signals in pairs in timed sequence, first switching means for selectively connecting predetermined signals from said source to said timing means, and second switching means for selectively transmitting signals selected by said first switching means for a relatively long time duration.

9. Selective signal transmitting apparatus including in combination, generator means providing a plurality of individual tones of different frequencies, timing means for automatically transmitting said tones in pairs with each pair being transmitted for a predetermined duration and being transmited after a predetermined interval after the preceding pair, first switching means for selectively connecting a plurality of pairs of tones to said timing means, and second switching means for transmitting one pair of tones selected by said first switching means for a relatively long time duration.

10. A selective responsive system including a transmitting unit and at least one receiving unit operatively associated therewith, said transmitting unit including means for transmitting a first signal including a plurality of components of different frequencies, said means transmitting said components for short durations in timed sequence, said transmitting unit also including means for transmitting a second signal for a relatively long time duration which simultaneously includes certain ones only of said components, said receiving unit including a circuit rendered operative by said first signal in response to said plurality of components when applied thereto for short durations and in timed sequence, and means including a portion of said circuit rendered operative by said second signal in response to said certain components only when applied thereto for a relatively long time duration.

11. A selective responsive system including a transmitting unit and a plurality of receiving units operatively associated therewith, said transmitting unit including means providing first signals including a given number of frequency components, said first signals being individually associated with said receiving unit with certain of the components thereof being the same for all units and the remaining components differing for the various units, said transmitting unit including means for transmitting said components of said first signals for short durations in timed sequence, said transmitting unit including additional means for transmitting said certain ones of said components simultaneously for a relatively long time duration, said receiving units each including first circuit means individually responsive to said first signals and including portions rendered operative in response to said components of one of said first signals when applied thereto for short durations in timed sequence, each of said receiving units also including second circuit means having portions in common with said first circuit means thereof and rendered operative by said second signal, said second circuit operating in response to said certain ones of said components when simultaneously applied thereto for a relatively long time duration, whereby all of said receiving units are simultaneously rendered operative by said second signal.

MARION R. WINKLER.

REFERENCES CITED

The following references are of record in the file of this patent:

UNITED STATES PATENTS

| Number | Name | Date |
|---|---|---|
| 2,319,339 | Muller et al. | May 18, 1943 |
| 2,395,693 | Sorenson | Feb. 26, 1946 |
| 2,470,145 | Clos | May 17, 1949 |
| 2,497,656 | Clarke | Feb. 14, 1950 |
| 2,524,300 | Taylor | Oct. 3, 1950 |
| 2,540,156 | Wright | Feb. 6, 1951 |